Patented Aug. 28, 1945

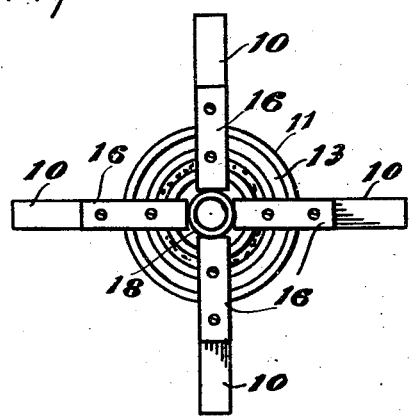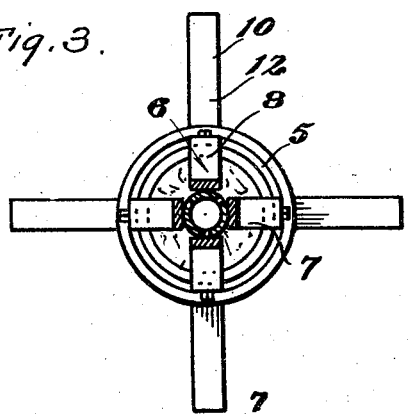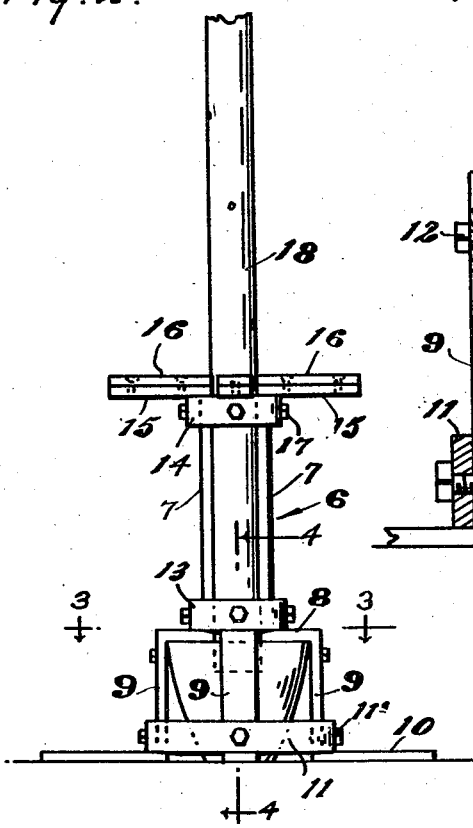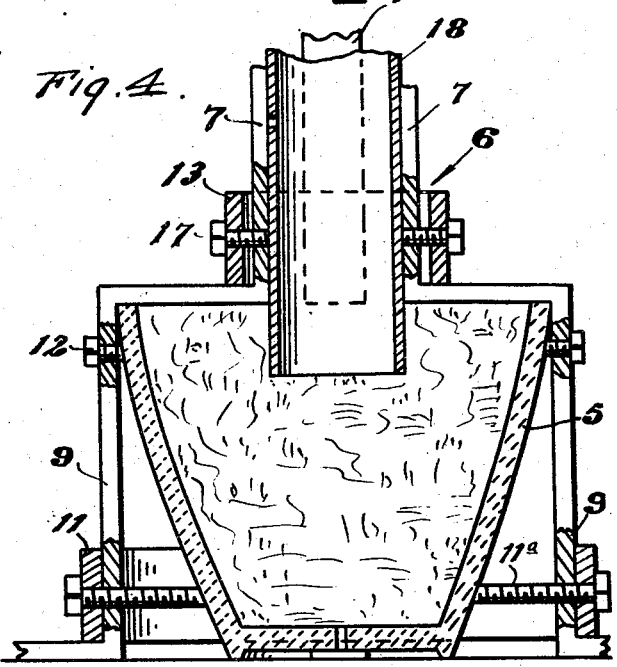

2,383,665

UNITED STATES PATENT OFFICE 2,383,665

PLANT SUPPORT

Leandro Malicay, Los Angeles, Calif.

Application April 19, 1944, Serial No. 531,811

2 Claims. (Cl. 47—47)

This invention relates to new and useful improvements in plant supports and more particularly to a support especially adapted for supporting climbing Philodendrons.

The principal object of the present invention is to provide a support which will serve to permit an efficient and sturdy support for climbing vines such as Philodendrons in which the parts can be readily reached for repairs or replacements.

Other objects and advantages of the invention will become apparent to the reader of the following description.

In the drawing:

Figure 1 is a top plan view.

Figure 2 is a fragmentary side elevational view.

Figure 3 is a horizontal sectional view taken on the line 3—3 of Figure 2.

Figure 4 is a fragmentary enlarged vertical sectional view taken on the line 4—4 of Figure 2.

Referring to the drawing wherein like numerals designate like parts, it can be seen that numeral 5 denotes a pot of suitable material for containing the roots of a Philodendron vine.

Numeral 6 generally refers to a stand which consists of a plurality of uprights 7 which at their lower portions are disposed outwardly as at 8 and downwardly as at 9, terminating in laterally disposed supporting feet 10.

A band 11 circumscribes the lower portions of the downwardly disposed parts 9 of the stand and set screws 11 extend through the band and the portions 9 and bear against the pot 5 to hold the pot in a definite position. Additional set screws 12 extend through the upper portions of the band parts 9 and bear against the upper portion of the pot 5.

Just above the shoulders 8, the stand members 7 have a band 13 and another band 14 adjacent the upper portions thereof. The upper portions of the stand members 7 are bent outwardly to provide arms 15 which support wooden strips 16. The bands 13 and 14 have set screws 17 feedable therethrough to bite into a vertically disposed perforated tube 18 which extend to the desired height.

The tube 18 is perforated so that moss which is to cover the tube 18 and arms 15 can receive water from the interior of the tube, it being preferable that water is provided to the vine by way of the tube 18 and the moss on the outside thereof. The moss holds moisture around the vine to be taken up by said vine.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A climbing plant support for use with a potted plant comprising a skeleton stand defining a bottom cage adapted to fit over the pot, clamping means on said cage adapted to secure the pot in the cage, said cage comprising upright members rising from the top thereof and surrounding the vertical axis of the cage in circular formation, an upright tubular perforated element fitting between said upright members and adapted for use in watering the plant, vertically spaced bands surrounding said members, and set screws extending through said bands and members and clampingly engaging said element.

2. A climbing plant support for use with a potted plant comprising a skeleton stand defining a bottom cage adapted to secure the pot in the cage, said cage comprising upright members rising from the top thereof and surrounding the vertical axis of the cage in circular formation, an upright tubular perforated element fitting between said upright members and adapted for use in watering the plant, vertically spaced bands surrounding said members, and set screws extending through said bands and members and clampingly engaging said element, said members having upper end lateral terminals provided with horizontal strips secured thereto and over which the plants may climb.

LEANDRO MALICAY.